UNITED STATES PATENT OFFICE.

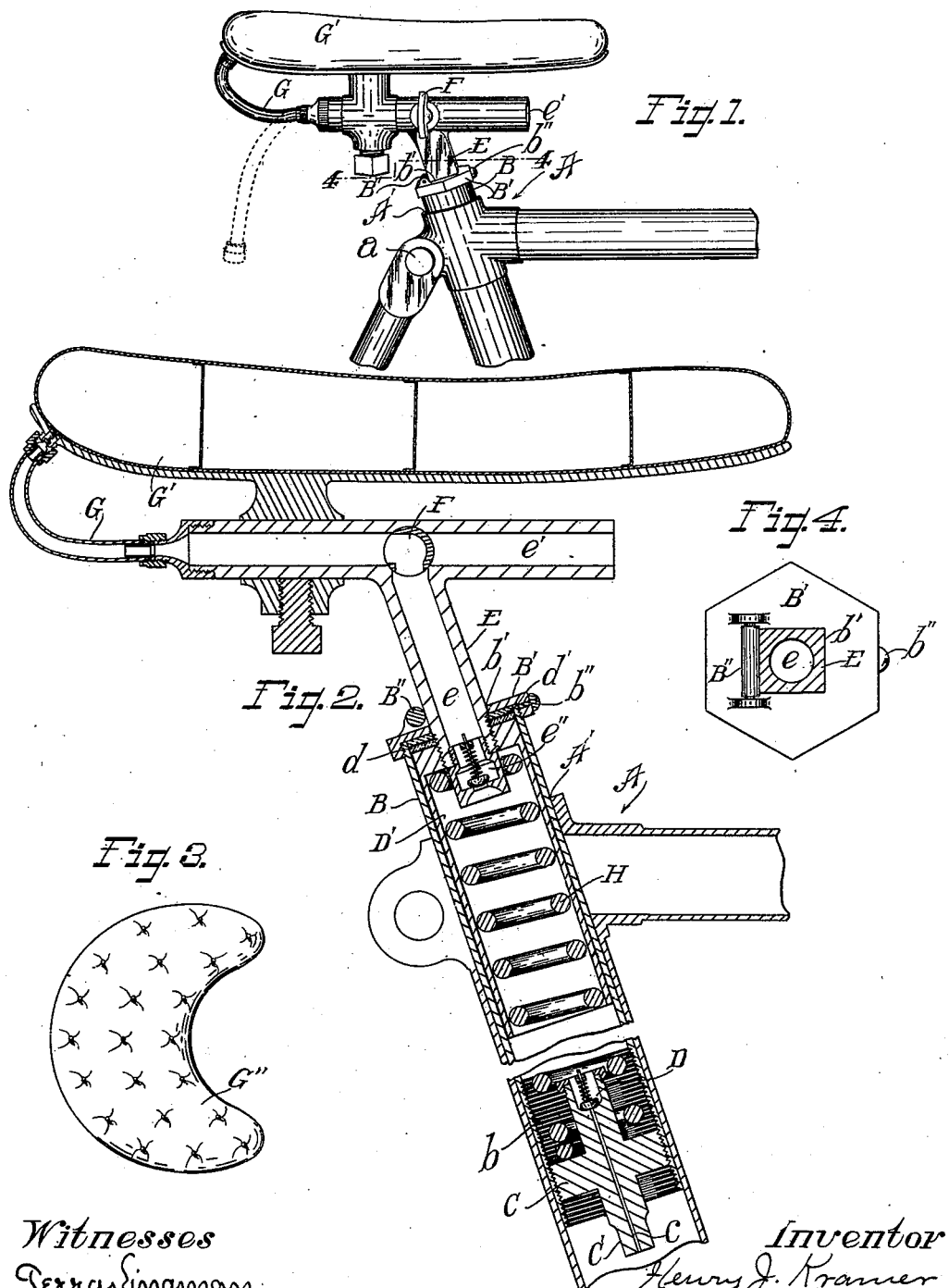

HENRY J. KRAMER, OF LOS ANGELES, CALIFORNIA.

BICYCLE SADDLE-POST.

SPECIFICATION forming part of Letters Patent No. 650,941, dated June 5, 1900.

Application filed September 21, 1896. Serial No. 606,581. (No model.)

*To all whom it may concern:*

Be it known that I, HENRY J. KRAMER, a citizen of the United States, residing at Los Angeles, in the county of Los Angeles and State of California, have invented a new and useful Automatic, Pneumatic, and Spring Bicycle Saddle-Post, of which the following is a specification.

It has heretofore been proposed to provide a bicycle saddle-post with a spring adapted to yieldingly support the rider and to prevent the transmission to the rider of vibration from the frame. One particular objection which many persons find in bicycle-riding is that even with the pneumatic saddle and tire the constant vibration is very severe and to one not strong and robust is very tiresome. In all devices of which I am aware in which the seat-post is provided with a spring which resists the thrust of the rider the recoil of the spring after it has been compressed is quite violent and throws a person upward with considerable force. This also produces a teetering motion of the saddle, which is very annoying and tiresome.

One object of my invention is to provide a saddle-post having a spring arranged to receive the thrust of the rider and also provided with means which will allow the spring to be readily compressed, but will operate to prevent it from too rapidly returning to its normal position, although finally fully releasing it, so it may exert its full force to support the rider.

My invention comprises the various features of construction and combinations of parts hereinafter fully set forth and claimed.

The accompanying drawings illustrate my invention.

Figure 1 is a fragmental side elevation of a bicycle-frame having my invention applied thereto. In this view the bicycle is shown provided with a pneumatic saddle, and suitable connection is made between the saddle and the exhaust-passage of the saddle-stem, whereby the saddle is automatically inflated by the reciprocation of the saddle-stem within the tube. Fig. 2 is a fragmental sectional view of my improved device in place in a bicycle-seat-post socket. In this view a portion is broken away to contract the view. Fig. 3 is a plan view of my improved bicycle-saddle, whereby the comfort of the rider is greatly increased. Fig. 4 is a fragmental sectional view on line 4 4, Fig. 1, looking down.

In the drawings, A represents a frame of a bicycle which is provided with the ordinary saddle-post socket A'. B represents an outer casing or tube which is adapted to fit within the socket and to be secured therein by means of a clamp-nut $a$ in the ordinary manner. The lower end of this tube or casing is provided with internal screw-threads $b$, and a plug C is arranged to screw thereinto. This plug is provided with a projecting stem C', which is angular at its lower end to adapt it for being grasped by a wrench, whereby the plug may be screwed into or out of the tube. A very small or restricted passage $c$ passes through the plug, and a valve D is arranged to control the passage, so as to allow air to be admitted into the tube, but to prevent it from escaping therefrom.

The upper end of the tube B is closed by means of a cap B', which is provided with an angular opening $b'$, within which is fitted an angular saddle-stem E, which is adapted to reciprocate vertically therein. An antifriction-roller B" engages the rear face of the stem to lessen the friction of the post as it reciprocates. It is necessary in order to provide a satisfactory saddle-post stem of this character that it be capable of being inserted into or removed from the seat-post socket of bicycles already in use. It is also necessary that the antifriction-roller engage with the stem at as great a distance from the piston as possible, in order to lessen the friction and strain upon the roller and the piston. By my feature of securing the roller upon the top face of the cap not only is the greatest possible distance secured between the bearings of the reciprocating stem, but also the roller is removed out of the way, so that the post can be inserted its full length into the saddle-post socket without the roller engaging with the walls of the socket. Not only is my arrangement very cheap, but it is exceedingly durable and convenient, providing a broad bearing-face, against which the weight of the rider is thrown, and thereby avoiding wearing grooves in the stem, which will be quickly done if a ball-bearing is provided for this purpose. Furthermore, any ball-bearing which can be provided for this purpose must be necessarily complicated, since it must be provided with means for taking up the wear. Secured upon this stem, below the cap B', is a piston D', which is fitted to slide air-tight within the tube B and is provided with a suitable packing d, as shown, whereby its air-tight working is insured. Through the stem passes an exhaust-passage e, which is controlled by means of a valve e'', which permits the air to freely escape from the tube, but prevents its entrance thereinto. In the T of the seat-post I provide a stop-cock F, which is so arranged that when turned as shown in Fig. 2 the exhaust from the tube B will pass through the stem and the tube G into the pneumatic saddle G', and when turned in another direction the air will exhaust from the front e' of the stem into the open air. When turned in still another position, the passage-way e will be entirely closed and the escape of air from the tube B prevented.

The piston D' is preferably hollow, as shown, and a spring-buffer H is arranged in the tube, with its upper end seated in the hollow piston and its lower end seated upon the plug C. This spring is preferably of such strength that when the plug C is in its lowest position it will yieldingly support a person of from one hundred to one hundred and fifty pounds weight. By screwing the plug C up into the barrel or tube B the spring is compressed and is made thereby capable of supporting a person of two hundred pounds or more. By this construction by simply removing the casing B from the seat-post socket and applying a wrench (not shown) to the angular end of the stem of the plug C the plug can be screwed into or out of the tube to give the tension desired.

In practice to assemble the parts first the cap B is slipped upon the angular stem E and then a washer d' is slipped upon the screw-threaded end of the stem. A packing d is placed upon the washer, and the piston D' is screwed upon the end of the post to grip the packing between itself and the washer. When the piston has been fully screwed home, it is inserted into the upper end of the tube B, and the cap is screwed upon the upper end of the tube. When the cap is fully seated, it is secured by means of a set-screw b'', so as to prevent the stem from turning. Then the tube is inverted and the spring H is slipped inside thereof, its upper end seated within the hollow piston and encircling the valve e'', after which the plug C is screwed into the lower end of the tube until the spring is sufficiently compressed to give the tension desired. Then the tube is slipped into the saddle-post socket of the bicycle and secured at the proper height by means of the clamp-nut. Then a saddle is secured to the seat-post, my device being applicable for any ordinary saddle, and, if desired, a pneumatic saddle, such as indicated by G', may be secured to the seat-post and connected with the exhaust-passage of the seat-post, as shown in Fig. 2. Ordinarily the saddle should be inflated before being placed in position.

When all is ready, the rider mounts the wheel, and when passing over rough ground his weight tends to force the seat-post downward, thus operating the piston and forcing the air out of the tube through the exhaust-passage. After the spring is compressed its tendency is to quickly expand, thus causing an uncomfortable teetering or bouncing motion; but with my device as soon as the spring is compressed to its lowest point and the piston starts upward the valve e'' closes and the pressure of the atmosphere retards the motion of the piston. The suction thus produced causes air to enter the tube through the small inlet, and as it gradually fills the tube the piston slowly resumes its normal position without any perceptible jolt or jar.

Thus I have produced a device in which a spring works in opposition to air-pressure, and whereby although the spring is finally released, so that it can exert its full power, the release is so gradual that no uncomfortable shock will be produced. It will of course be understood that the stem E does not work air-tight in the opening b'.

My device is especially applicable for use by the gentler sex, since any shape or kind of saddle desired, either solid, upholstered, as indicated by G'', Fig. 3, or pneumatic, may be used, the necessity of providing springs in the saddle being entirely done away with. The objectionable projecting horn is also unnecessary, and thereby I avoid all uncomfortable and injurious pressure present in the old form of saddle.

When it is desired that the escape of air from the tube shall be perfectly free and unrestricted, the valve F is turned to discharge the exhaust-air through the front portion of the saddle-post stem. When it is desired to operate to pump the air into the saddle, the tube G is connected with the saddle, as shown, and any downward motion of the plunger will tend to force air from the tube into the saddle, thus maintaining the saddle constantly full. When the desired pressure has been stored within the saddle, the valve F may be turned to cause the air to exhaust from the front portion of the stem.

In case of emergency the tube G may be attached to the bicycle-tire, and by reciprocating the saddle-stem the tire may be inflated, thus avoiding the necessity of carrying a bicycle-pump.

If it is found that the spring alone has not sufficient strength to support the weight of the rider and it is desired to remedy the matter without dismounting, the stop-cock F may be turned so as to close the exhaust-passage, and thus the air within the tube will be compressed by the reciprocation of the piston and will operate to aid the spring in supporting the saddle-post. Of course when this is done the result will not be so satisfactory, since the rebound will be restrained only by the air confined between the piston-head and the cap B', and since the post E is not tightly fitted to the opening b' this air will escape so rapidly as to not act as an efficient buffer.

By my invention the durability of a wheel is increased, since all violent shocks are absorbed by the buffer, and much of the strain to which bicycles having rigid saddle-posts and frames are subjected is prevented. My invention may be applied to bicycles having solid or cushion tires and will render such bicycles more comfortable to ride upon than bicycles provided with the ordinary fixed saddle-post and pneumatic tires, since the jar or shocks produced from riding over uneven roads will be absorbed without producing the rocking or springing motion induced by spring-buffers as ordinarily constructed. One important feature of my invention is that by restricting the expansion of the spring-buffer there is no liability of pitching the rider from the saddle by the violent rebound of the spring after being compressed by the bicycle passing over some unusually large obstruction. Furthermore, the motion being up and down in substantially a vertical line, there is no tendency to toss the rider off the seat, and therefore the necessity of riding upon the pedals when passing over rough ground is avoided.

The height of the saddle may be regulated by unscrewing the clamp-bolt a and adjusting the tube B in the same manner in which the ordinary saddle-post is adjusted.

Now, having described my invention, what I claim as new, and desire to secure by Letters Patent, is—

1. The combination with a bicycle seat-post, of a saddle-stem, a spring arranged to resist the depression of the stem, an air-chamber, means for permitting the free egress of air from the chamber when the saddle-stem is being depressed and for permitting relatively-slow ingress of air into the chamber as the said stem ascends, substantially as described.

2. A bicycle saddle-post, comprising a spring-supported plunger working within an air-tight chamber, a restricted valve-controlled passage leading into the chamber, and a valve-controlled exhaust-passage leading from the chamber, substantially as described.

HENRY J. KRAMER.

Witnesses:
 ALFRED I. TOWNSEND,
 JAMES R. TOWNSEND.